May 24, 1966     H. E. REXFORD     3,252,779
METHOD OF FIRE-POLISHING EDGES OF HOLLOW ARTICLES
Filed Sept. 18, 1962
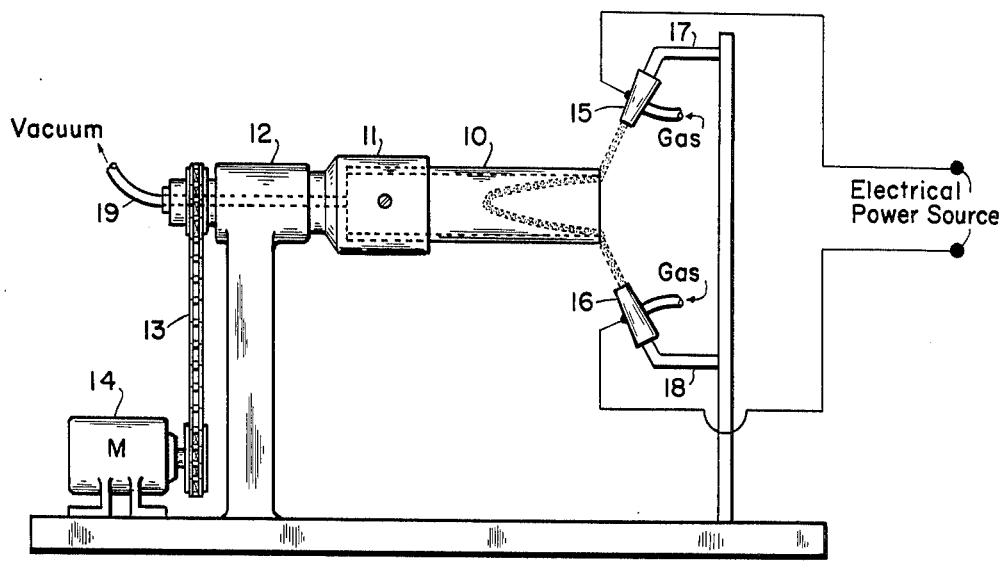
INVENTOR.
*Harry E. Rexford*
BY
*HIS ATTORNEY*

United States Patent Office 3,252,779
Patented May 24, 1966

3,252,779
METHOD OF FIRE-POLISHING EDGES OF
HOLLOW ARTICLES
Harry E. Rexford, Trenton, N.J., assignor to Corning
Glass Works, Corning, N.Y., a corporation of New
York
Filed Sept. 18, 1962, Ser. No. 224,302
7 Claims. (Cl. 65—120)

This invention relates to improvements in methods for fire-polishing the edges of hollow articles of thermoplastic materials, particularly glass articles, and for forming beads on such edges.

In the past, it has been customary simply to direct heat, either from a burner or from an electric arc or from a combination of the two, against the edges to be fire-polished, usually while rotating the article. Such methods are slow and tend to produce deformation of the edges of the article during fire-polishing. A particular problem has been the outward flaring of the polished ends of glass articles, for example, the polished ends of cylindrical glass tubing. Until the present invention, no satisfactory method has been known for preventing such flaring during fire-polishing or for producing controlled deformation in the opposite direction, that is, constriction of an opening during fire-polishing.

Accordingly, it is an object of the invention to permit the fire-polishing of such edges without deformation or with controlled deformation thereof.

A further object is to permit such fire-polishing to be effected in shorter times than are required by previous methods.

These and other objects, which will be apparent from the description, are accomplished by directing heat against an edge of a hollow article while maintaining a partial vacuum within the cavity of the article in order to draw heated air into the cavity during fire-polishing.

The invention will be described with reference to the accompanying drawing, which is a side elevational view of apparatus for fire-polishing glass tubing according to the invention.

A section of glass tubing 10 is mounted in chuck 11, which is supported by and rotatable within collar 12. Rotation of chuck 11 is effected by chain 13, which is drived by motor 14. Gas-oxygen burners 15 and 16 are located near the end of the tubing which is to be fire-polished. Burners 15 and 16 are mounted respectively on electrically insulating arms 17 and 18 and are connected to a source of electrical current, either direct or alternating, as shown. Vacuum line 19 is connected to chuck 11 and communicates with the interior thereof as illustrated by the broken lines. Tubing 10 is held tightly within the chuck so that air or gas entering the chuck to fill the partial vacuum produced by the vacuum line passes through the interior of the tubing.

Heat may be supplied to the edge of the tubing in several ways. Flames from burners 15 and 16 may be directed against the end of the tubing and may be the sole source of heat. In the preferred embodiment of the invention, the flames may act as gaseous conductors for an electrical current flowing between the burners. In a third embodiment of the invention, an electrical arc may be struck between the burners or other suitable electrodes in the absence of flames. These methods of heating are well known to those skilled in the art.

In order to assist in directing heat uniformly against the edge of tubing 10, the tubing is rotated continuously, and vacuum is applied by means of vacuum line 19. Several advantages accrue from this use of a vacuum. In the preferred embodiment of the invention, the partial vacuum within the tubing draws the burner flame and the electric arc down the center of the tubing, thus assisting in polishing the inner surface and edges of the tubing. Due to the lengthening of the path of the arc and the consequent increase in its resistance, more heat is produced, and fire-polishing is effected more quickly than in the absence of the vacuum. Most important, depending upon the degree of partial vacuum, flaring of the tubing can be eliminated, or, if desired, the diameter of the tubing may be decreased at its end. For any given size of tubing, greater degrees of partial vacuum will produce greater amounts of constriction or "toe-in," of the tubing at its end. Diameter control by the use of vacuum along with the heating means may be effected not only when the combination of burners and an electric arc is employed, as in the preferred embodiment of the invention, but is effective as well when either heating means is utilized separately.

Although the degree of vacuum to be used with objects of varying shapes and of varying thermoplastic compositions may easily be determined experimentally to give the desired configuration of polished edge, the following example is given as a specific embodiment of the invention:

A piece of cylindrical glass tubing having an outer diameter of approximately ½ inch was placed in a chuck as illustrated in the drawing and was caused to rotate at the rate of 300 revolutions per minute. The burners were adjusted to provide needle flames, and a 60 cycle alternating potential was imposed between the burners to produce an arc therebetween. Measurement showed the voltage across the arc to be 950 volts and the current to be 0.76 ampere. The vacuum was determined as that which produced a flow of 4 cubic feet of air per minute through a cross-section of the bore of the tubing, which bore had a diameter of ⅜ inch. The time taken to fire-polish and bead the end of the tubing was 4 seconds—a time substantially shorter than that required in the absence of vacuum.

Although the invention has been described with reference to the process whereby the ends of glass tubing are polished by the use of gas-oxygen burners and electric arcs, it will be understood that the invention embraces the use of vacuums within the hollow interiors of all thermoplastic objects which are amenable to fire-polishing, regardless of shape or composition and that any conventional means may be employed to supply heat to the article. Although generally advantageous, it will be understood that rotation of the article is not essential and that burners in the forms of rings or other configurations corresponding to those of the edges to be firepolished may be employed in lieu thereof. It is to be understood that the present invention resides in the improvement in fire-polishing techniques which comprises maintaining inside a hollow object a pressure lower than that of the ambient atmosphere and thereby creating a flow of heat from outside said object to the interior thereof and in proximity with the edges to be fire-polished. Accordingly, it is intended that the invention be limited only by the scope of the appended claims.

What is claimed is:

1. The method of fire-polishing an edge adjacent to an opening leading into the interior of a hollow article of a thermoplastic material which comprises directing heat against said edge in an amount and at a temperature sufficient to fire-polish said edge while maintaining said interior at a pressure sufficiently low to draw heat into said interior, yet sufficiently high to prevent collapse of said article.

2. The method according to claim 1 which includes directing flames from at least two burners toward said edge while maintaining said burners at differing electrical potentials and thereby effecting the flow of electrical current therebetween.

3. The method of fire-polishing an end of a piece of hollow cylindrical glass tubing which comprises simultaneously rotating said tubing about its axis, directing heat against said end of said tubing in an amount and at a temperature sufficient to fire-polish said end and maintaining the interior of said tubing at a pressure sufficiently low to draw heat into said interior, yet sufficiently high to prevent collapse of said tubing.

4. The method according to claim 3 which includes directing flames from at least two burners toward said end of said tubing while maintaining said burners at differing electrical potentials and thereby effecting the flow of electrical current therebetween.

5. The method of fire-polishing an edge adjacent to an opening leading into the interior of a hollow article which comprises directing heat against said edge in an amount and at a temperature sufficient to fire-polish said edge while removing air from said interior at a location spaced from said opening at a rate which maintains said interior of said article at a pressure sufficiently low to draw heat into said interior, yet sufficiently high to prevent collapse of said article.

6. The method of fire-polishing an end of a piece of hollow cylindrical glass tubing which comprises simultaneously rotating said tubing about its axis, directing heat against said end in an amount and at a temperature sufficient to fire-polish said end and removing air from the interior of said tubing at the remaining end of said piece of tubing at a rate which maintains the interior of said tubing at a pressure sufficiently low to draw heat into said interior, yet sufficiently high to prevent collapse of said tubing.

7. The method according to claim 6 which includes directing flames from at least two burners toward the end to be fire-polished while maintaining said burners at differing electrical potentials and thereby effecting the flow of electrical current therebetween.

References Cited by the Examiner

UNITED STATES PATENTS

| 1,458,030 | 6/1923 | Chaney | 65—120 |
| 2,422,482 | 6/1947 | Guyer | 65—271 |
| 3,078,694 | 2/1963 | Schoenmakers et al. | 65—120 |

DONALL H. SYLVESTER, *Primary Examiner.*

A. D. KELLOGG, *Assistant Examiner.*